Feb. 3, 1953
J. E. BROWDER ET AL
2,627,598
PHASE SHIFT SYSTEM
Filed Feb. 20, 1947
2 SHEETS—SHEET 1
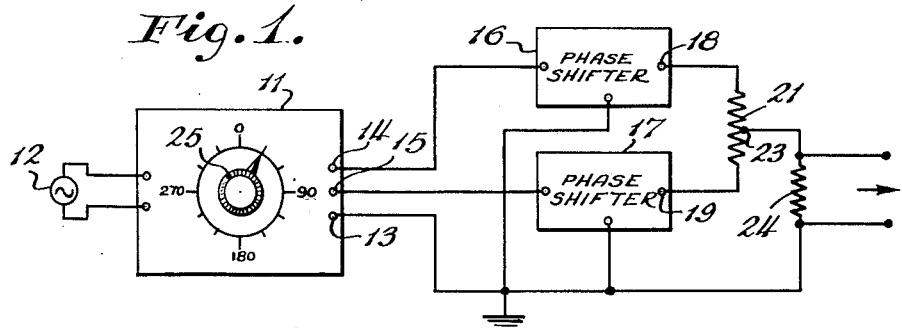
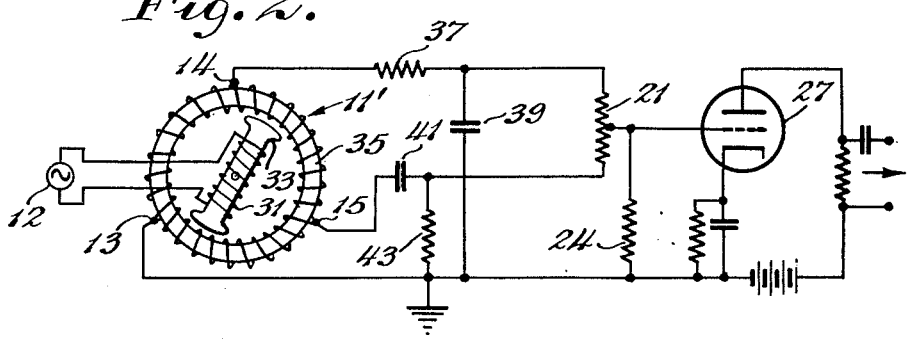
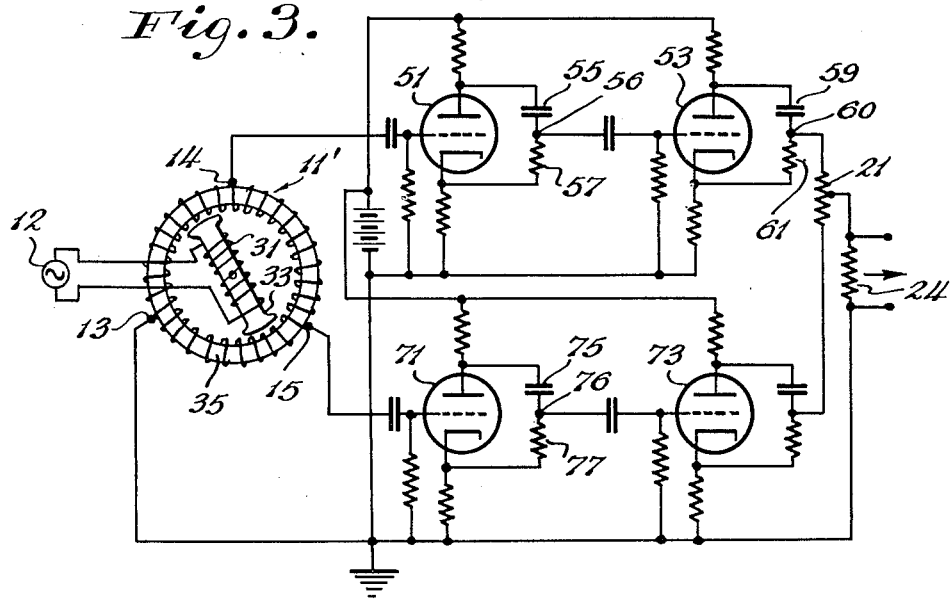
INVENTORS
JAY E. BROWDER
VICTOR J. YOUNG
BY
Herbert H. Thompson
their ATTORNEY Feb. 3, 1953 J. E. BROWDER ET AL 2,627,598
PHASE SHIFT SYSTEM
Filed Feb. 20, 1947 2 SHEETS—SHEET 2
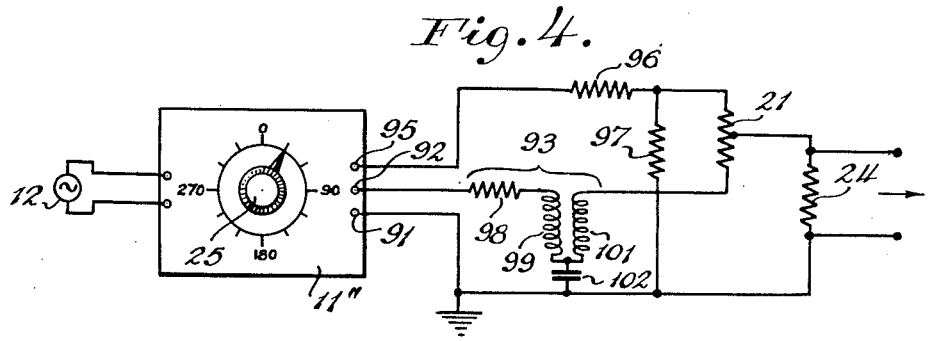
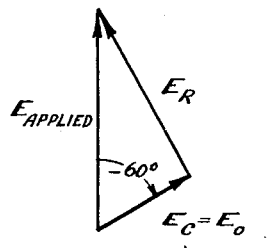
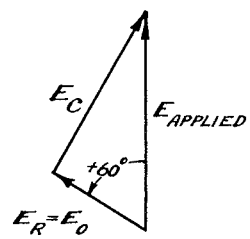
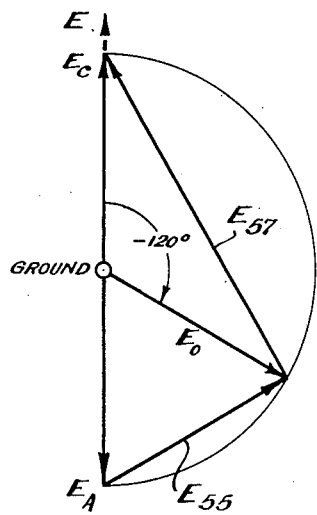
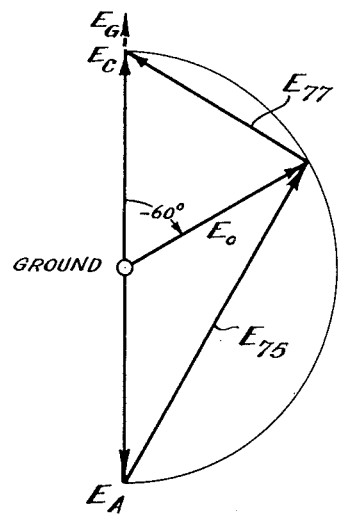
INVENTORS
JAY E. BROWDER
VICTOR J. YOUNG
BY
Herbert A. Thompson
their ATTORNEY Patented Feb. 3, 1953

2,627,598

UNITED STATES PATENT OFFICE 2,627,598

PHASE SHIFT SYSTEM

Jay E. Browder, Garden City, and Victor J. Young, Jamaica, N. Y., assignors to The Sperry Corporation, a corporation of Delaware Application February 20, 1947, Serial No. 729,852

6 Claims. (Cl. 323—109)

The present invention relates to phase shift systems and networks.

The object of this invention is to provide an improved phase shift system. More specifically, it is an object to provide electric systems suitable for receiving single phase input voltage and for providing wide range phase control of an output voltage. Among the features attained by the invention are: phase shifts through very wide continuous phase shift ranges, linearity of phase shift with movement or displacement of a shiftable phase control member, constancy of the output voltage amplitude with variations of phase thereof, and in instances where this is of primary importance, the provision of phase shift and amplitude controlled independently of the frequency of the single phase source.

Heretofore, telemetering units such as selsyns have been used as phase shifters for receiving polyphase excitation of their symmetrically disposed multiple windings, and for production of single-phase output voltage of phase controlled according to the angular displacement of the selsyn control member. The basic requirement of polyphase energization of the selsyn has been a serious drawback, rendering this system unsuited for many applications. Not only must the energy source be a polyphase source, but also the phase voltages thereof must be balanced and symmetrically phased at all times for attainment of proper performance of this prior system.

Attempts have been made to employ passive phase shifting networks to receive energy from a single phase source and to provide polyphase energization voltages for the multiple winding sections of a selsyn unit, but the success of such attempts is limited by the dependence of the phase shifts and output voltages of the networks upon the input impedance presented by these winding portions of the selsyn, these impedances being greatly dependent upon rotor position and load impedance.

An important feature of the present invention is the use of a multiple-circuit variable coupling device with single phase excitation for production of relatively varying output component amplitudes, with fixed phase shifting and addition of the output components in such a manner as to provide a resultant output voltage of constant amplitude and of phase corresponding to the extent of relative variation of the output components. A telemetric unit or self-synchronous unit such as a selsyn or Autosyn or Telegon may be used as the multiple-circuit variable coupling device, the single-winding part being energized by the single-phase source and the multiple-circuit part being connected to the fixed phase shifting and component combining circuits.

The invention also relates to the novel features or principles of the instrumentalities described herein, whether or not such are used for the stated objects, or in the stated fields or combinations.

Systems of this type are illustrated in the attached drawings wherein,

Fig. 1 is a general schematic representation of the present invention;

Figs. 2, 3 and 4 are circuit diagrams of particular phase shifter embodiments of the present invention;

Figs. 5 and 6 are vector diagrams illustrating the operating principles of the circuit arrangement of Fig. 2; and Figs. 7 and 8 are vector diagrams illustrating the operating principles of the circuit arrangement of Fig. 3.

Referring now to Fig. 1, a variable control device 11 is arranged to receive a single phase input voltage from a source 12 and to produce a plurality of cophasal output voltage components, e. g., a first voltage component between output terminals 13 and 14 and a second output voltage component between terminals 13 and 15. The first output voltage component is applied to the input circuit of a network 16 such as a first phase shifter, and the second output voltage is applied to the input circuit of a second network such as a phase shifter 17. The output terminals 18 and 19 of phase shifters 16 and 17 are connected to the opposite ends of a resistor 21 having a center tap 23 connected to one end of an output resistor 24. The opposite end of the resistor 24 is connected to the common output terminal 13 of the control device 11, and to the common terminals of the networks 16 and 17.

The variable control device 11 includes a movable control element such as a rotatable controller 25 and this unit preferably produces amplitude variation of the first output voltage component according to the sine of its angular displacement from a reference position, e. g., from the 0° position, and amplitude variation of the second output voltage component according to the sine of the sum of a fixed angle and the angular displacement from the reference position. Unit 11 may take any of a variety of forms, of which potentiometric and transformer units are most common, variable transformer units of this type being particularly well known wherein the fixed angle referred to above is either 90° or 120°.

A selsyn or variable transformer unit 11' based on the 120° angle design is illustrated in the circuit diagram of Fig. 2. In this view, the connections of the source 12 to a single rotor winding 31 are illustrated, the rotor unit 33 being arranged within a ring stator 35 having three successive winding sections disposed thereabout. The first output voltage component between the common output terminal 13 and output terminal 14 is applied to a phase shifting network comprising a series resistor 37 and a shunt capacitor 39. The second output voltage component is applied to a second phase shifting network comprising a series capacitor 41 and a shunt resistor 43. The first network 37, 39 provides a phase-retarded output version across capacitor 39, while the second network 41, 43 provides a phase-advanced output voltage version across resistor 43. These output versions are supplied to a combining circuit of the type described above, and this circuit provides a resultant output voltage across the resistor 24. This output voltage is shown as applied to the grid of an amplifier tube 27, for example.

Where the variable coupling device has 120° displacement of its multiple component windings, as in Fig. 2, it is necessary that the output voltage versions provided by networks 37, 39 and 41, 43, be characterized by a phase separation of 120°. Accordingly the resistance and reactance values of elements 37, 39 and 41, 43 are determined according to the vector diagrams shown in Figs. 5 and 6. Fig. 5 includes the vector $E_R$ corresponding to the voltage drop across resistor 37 and a perpendicular vector $E_C$ corresponding to the voltage drop across capacitor 39. The vector sum of these voltages is the applied voltage vector, being the vector forming the hypothenuse of the right triangle in Fig. 5. The ratio of the impedance magnitudes of capacitor 39 and resistor 37 is made equal to the cotangent of 60°, so that the voltage across capacitor 39 lags the applied voltage by 60° and is of amplitude one-half the amplitude of the applied voltage component. The magnitudes of capacitor 41 and resistor 43, similarly are determined according to the vector diagram of Fig. 6, so that the output voltage version across resistor 43 leads the applied voltage by 60° and is of one-half the amplitude thereof.

These output voltage versions across capacitor 39 and resistor 43 are delivered to the opposite terminals of the very high impedance combining circuit which includes center-tapped resistor 21 with the tap thereof connected to the output resistor 24. The elements of the networks 37, 39 and 41, 43 may be of impedance values of the order of 10,000 ohms, as may also the resistor 24 but the magnitude of resistance 21 should be many times higher, in order that the phase shift in the networks be substantially undisturbed by the loading of the output combining circuit.

As is apparent from Figs. 5 and 6, the output voltage versions of the respective networks 37, 39 and 41, 43 are 120° apart, and are equal when the first and second output voltage components provided by the variable transformer arrangements 11' are equal. If the rotor 33 is shifted from a position at which it provides equality of the first and second output voltage amplitudes, one of these component amplitudes increases toward a maximum value while the other decreases. The resultant voltage across resistor 24 does not vary in amplitude with such a change of relative magnitudes of the transformer output voltage components, but the phase of the resultant output voltage is varied through an angle corresponding identically to the angle through which the control element 33 of the selsyn 11' is rotated, as by a control knob of the sort shown at 25 in Fig. 1.

In actual application, the rotatable member 33 may be coupled to an instrument for transmission of directional data therefrom, as for example to a compass unit or to a directional gyroscope, or to a rotatable searchlight or artillery unit. With the features of the present invention, the phase angle of the output voltage across resistor 24 (relative to the input voltage from source 12) accurately represents the angle of rotation of the equipment unit to which the element 33 is coupled.

The arrangement of Fig. 2 is satisfactory for use only in applications where the frequency of the source 12 is fixed. Variations of frequency of this source would be disruptive of operation of this circuit arrangement, causing a change of amplitude of the output version of network 41, 43 directly with frequency and of the amplitude of network 37, 39 inversely with frequency. A system is shown in Fig. 3 wherein the amplitudes of the phase shifted voltage versions remain constant independently of variations of the frequency of source 12. Moreover, the phase angle between the respective phase shifted versions of the first and second phase shifting networks is substantially independent of source frequency over a relatively wide range.

In the system of Fig. 3, the first phase shifting network comprises first and second vacuum tubes 51 and 53 each connected as a phase inverter stage for providing equal and mutually opposed output voltages. A series capacitance-resistance output circuit 55, 57 is connected between the anode and cathode of the first tube 51, and the control grid of the second tube 53 is coupled to the junction between elements 55 and 57. Another capacitance-resistance network 59, 61 is connected between anode and cathode of the second tube 53, providing an output voltage version at the junction 60 which is shifted by the total extent of the cascade phase shifts of stages 51 and 53. A second pair of phase shift stages 71, 73 is provided as a second and generally similar phase shifting network for receiving the second output voltage component from selsyn 11' and energizing the combining circuit 21, 24 for providing an output voltage varying as the resultant of the phase shifted versions.

The phase relations between the first output voltage component from unit 11' and the voltage version between grounded or common terminal 13 and the junction 56 of capacitor 55 and resistor 57 is represented as −120° in the vector diagram of Fig. 7. The voltage between ground and the grid of tube 51 is illustrated by the vector extending vertically upward from the origin, the upper end of this vector being designated $E_G$. The alternating voltage produced at the cathode of tube 51 is represented by vector $E_C$, while the alternating voltage produced at the anode is of the opposite phase as represented by vector $E_A$. The total voltage between the cathode and the anode of tube 51 is applied to the series resistance-reactance circuit elements 55, 57, and the impedance values of these elements are in such ratio that the amplitude of the voltage drop across capacitor 55, represented by vector $E_{55}$, is equal to the amplitudes of the anode voltage and the cathode voltage. For this purpose, the impedance magnitude of resistor 57 is greater than that of capacitor 55 in the ratio $\sqrt{3:1}$. Hence, the voltage version between ground and the tap 56 is as represented by vector E₀ in Fig. 7, this voltage lagging the grid and cathode voltages by a 120° phase angle.

The operation of the network connected to tube 71 is illustrated in Fig. 8, and, as this diagram shows, the voltage across the resistor 77 is made equal to the amplitude of the anode voltage, resistor 77 being of smaller impedance magnitude than capacitor 75 in the ratio $$\frac{1}{\sqrt{3}}$$

As a result, the output vector E₀ corresponding to the voltage between ground and the intermediate terminal 76, lags applied grid voltage by a 60° angle and thus, this voltage version is 60° ahead of the voltage version at terminal 56. Further networks including the cascade amplifier tubes 53, 73 are designed substantially identically with the networks of tubes 51, 71, respectively, so that an additional relative phase shift of 60° is produced between the output vector voltages of stages 53, 73, the overall output phase shifts therefore being such that the versions added through resistors 21, 24 are separated by a 120° phase angle.

An increase of the frequency of the source 12 causes substantially equal increases of the lag angles of all of the phase shifting circuits in Fig. 3, but the relative phase displacement between the versions at the output circuits of tubes 53 and 73 remain at substantially 120° phase separation. Furthermore, these phase shift circuits are such that their output amplitudes bear constant relations to the amplitudes of the applied grid voltages, as is shown by the contemplation of the semicircular loci of the tips of the E₀ vectors in Figs. 7 and 8. Accordingly, a system of the sort shown in Fig. 3 designed for a source frequency of 100 cycles per second will perform nicely even when the source frequency is changed to 80 cycles per second or to 120 cycles per second, for example. Such changes of source frequency do not require any redesign of the phase shift circuit elements, but merely require that a shift corresponding to the frequency change be made in the position of the selsyn stator 35, or in the calibration scale associated therewith.

While the variable transformer or selsyn units 11' illustrated in Figs. 2 and 3 are shown as 120° component units, a unit with 90° displacement between the output component windings may be employed in an embodiment of the present invention, as illustrated in Fig. 4. Units of this type are readily available for this purpose, including Autosyns and Telegon units. The 90° telemetric unit 11" in Fig. 4 is energized by the single-phase source 12 and is connected to supply a first output component between terminals 91 and 92 to the first network 93, and a second output component between terminals 91 and 95 to a second output coupling network comprising resistors 96, 97. As will be apparent, network 96, 97 is a mere voltage dividing network affording no phase shift. Network 93, on the other hand, including the resistor 98, mutually coupled inductor sections 99 and 101, and shunt capacitor 102, is a 90° phase shift network, as known in the art and as described in a paper entitled "90° wide band phase shift circuit" by Honnell, page 166 of "Electronics" for November 1945.

This network affords the feature of 90° phase shift independently of the frequency of source 12, and a constant output voltage version amplitude relation to its input voltage component amplitude, which likewise is independent of frequency of source 12. The 90° phase shift in network 93 is the total phase shift needed with a 90° telemetric unit 11', and hence, the network 96, 97 is constructed for zero phase shift and is provided here merely for equalization of the output version amplitudes when the transformer unit 11" is positioned for equality of the component amplitudes at terminals 92 and 95.

With the feature of the constant phase shift in network 93, the arrangement in Fig. 4 not only is capable of performing properly with constant output amplitude and with accurate phase shift responsive to movements of the control element 25, but also, this arrangement requires no initial offsetting of the stator or the calibration scale of the telemetric unit 11" for relatively wide changes of frequency of the source 12. Thus, the arrangement shown in Fig. 4 is substantially universal as to input frequency.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A phase shifting device capable of producing a phase shift proportional to the angular rotation of a control member while maintaining a substantially constant voltage amplitude output, said device comprising an inductive selsyn-like transformer having rotor and stator cores of magnetic material, a single phase winding on said rotor core and a polyphase winding comprising windings mounted on said stator core in 120° angular relation with respect to each other, said windings being wound to provide substantially equal induced voltages in each stator winding when maximum coupling occurs between it and said rotor winding, a control member for angularly adjusting the rotor relative to the stator, phase shifting means in circuit with a first of said stator windings, phase shifting means in circuit with a second of said stator windings, said phase shifting means providing a phase difference of 120° between the voltage outputs thereof, and means comprising an impedance of a value high compared to the impedance of said phase shifting means for additively combining the output voltages of said phase shifting means to supply a resultant voltage output; whereby the phase shift of the resultant output voltage will be proportional to the angular position of the control member while the amplitude thereof will be a constant.

2. A phase shifting device capable of producing a phase shift proportional to the angular rotation of a control member while maintaining a substantially constant voltage amplitude output, said device comprising an inductive selsyn-like transformer having rotor and stator cores of magnetic material, a single phase winding on said rotor core and a polyphase winding comprising three windings mounted in substantially equiangular relative relationship on said stator core, said windings being wound to provide substantially equal induced voltages in each stator winding when maximum coupling occurs between it and said rotor winding, a control member for angularly adjusting the rotor relative to the stator, said transformer being arranged to provide a first output voltage component varying in amplitude in accordance with the sine of the displacement of said control member from a reference position and to provide a second output voltage component varying in amplitude in accordance with the sine of the sum of a fixed angle and the displacement of said control member from said reference position, coupling circuits connected with said stator windings including phase shifting means for producing a fixed 120° relative phase shift between said voltage components, and means comprising an impedance of a value high compared to the impedance of said coupling circuits for additively combining said voltage components and supplying a resultant voltage output; whereby the phase shift of the resultant output voltage will be proportional to the angular position of the control member while the amplitude thereof will be a constant.

3. A phase shifting device capable of producing a phase shift proportional to the angular rotation of a control member while maintaining a substantially constant voltage amplitude output, said device comprising an inductive selsyn-like transformer having rotor and stator cores of magnetic material, a single phase winding on said rotor core and a polyphase winding comprising three windings mounted in substantially equi-angular relative relationship on said stator core, said windings being wound to provide substantially equal induced voltages in each stator winding when maximum coupling occurs between it and said rotor winding, a control member for angularly adjusting the rotor relative to the stator, phase shifting means connected with a first of said stator windings, phase shifting means in circuit with a second of said stator windings, both of said phase shifting means providing a phase shift in the same direction but to different amounts whereby to provide a relatively fixed phase difference of 120° between the output voltages thereof, said phase shifting means being so constructed and arranged that phase shifts produced thereby in response to changes in frequency of the voltages supplied thereto are substantially equal, and means comprising an impedance of a value high compared to the impedance of said phase shifting means for additively combining the output voltages of said phase shifting means to supply a resultant voltage output; whereby the phase shift of the resultant output voltage will be proportional to the angular position of the control member while the amplitude thereof will be a constant.

4. A phase shifting device capable of producing a phase shift proportional to the angular rotation of a control member while maintaining a substantially constant voltage amplitude output, said device comprising an inductive selsyn-like transformer having rotor and stator cores of magnetic material, a single phase winding on said rotor core and a polyphase winding comprising three windings mounted in substantially equi-angular relative relationship on said stator core, said windings being wound to provide substantially equal induced voltages in each stator winding when maximum coupling occurs between it and said rotor winding, a control member for angularly adjusting the rotor relative to the stator, phase shifting means in circuit with a first of said stator windings, phase shifting means in circuit with a second of said stator windings, each of said phase shifting means comprising cascade connected phase shifting stages and each stage comprising an electron tube having an impedance-reactance network connected in the cathode-anode circuit thereof, the phase shifting stages being arranged to provide phase shifts in the same direction but to different amounts whereby to provide a relatively fixed phase difference of 120° between the output voltages thereof which will remain a constant if changes occur in the frequency of said single phase source, and means for additively combining the output voltages of said phase shifting means to supply a resultant voltage output; whereby the phase shift of the resultant output voltage will be proportional to the angular position of the control member while the amplitude thereof will be a constant.

5. Phase shifting apparatus of the character described comprising means for receiving a single phase input voltage and for supplying a plurality of output voltage components, said means including a control member arranged to vary the amplitude of a first output voltage component in accordance with the sine of the displacement of said control member from a reference position and to vary the amplitude of a second output voltage component in accordance with the sine of the sum of a fixed angle and the displacement of said control member from said reference position, means connected to receive said first output voltage component including a pair of cascade connected electron tube stages each having fixed phase shifting impedance-reactance networks connected in circuit therewith, means connected to receive said second output voltage component including a pair of cascade connected electron-tube stages each having fixed phase shifting impedance-reactance networks connected in circuit therewith, and means for additively combining the outputs of the cascade connected phase shifting means, both of said cascade connected phase shifting networks being so constructed and arranged as to shift the phase angle in the same direction but in different amounts.

6. Apparatus as defined in claim 2, wherein the phase angle of said fixed relative phase shift is equal to said fixed angle.

JAY E. BROWDER.
VICTOR J. YOUNG.

REFERENCES CITED

The following references are of record in the file of this patent:

UNITED STATES PATENTS

| Number | Name | Date |
| --- | --- | --- |
| 2,231,955 | Schrader | Feb. 18, 1941 |
| 2,241,615 | Plebanski | May 13, 1941 |
| 2,256,482 | Isbister | Sept. 23, 1941 |
| 2,256,538 | Alford | Sept. 23, 1941 |
| 2,285,969 | Hempel | June 9, 1942 |
| 2,356,186 | Somers | Aug. 22, 1944 |
| 2,405,568 | Ferrill | Aug. 13, 1946 |
| 2,434,057 | Sproule | Jan. 6, 1948 |